United States Patent [19]

Land

[11] 4,181,778
[45] Jan. 1, 1980

[54] NOVEL BATTERY ANODE
[75] Inventor: Edwin H. Land, Cambridge, Mass.
[73] Assignee: Polaroid Corporation, Cambridge, Mass.
[21] Appl. No.: 667,855
[22] Filed: Mar. 17, 1976

Related U.S. Application Data

[63] Continuation-in-part of Ser. No. 443,126, Feb. 15, 1974, abandoned.

[51] Int. Cl.² .............................................. H01M 2/12
[52] U.S. Cl. ...................................... 429/53; 429/152; 429/162
[58] Field of Search ................... 136/111, 30, 108–110, 136/134; 429/152–155, 162, 53

[56] References Cited
U.S. PATENT DOCUMENTS

| | | | |
|---|---|---|---|
| 2,987,567 | 6/1961 | Freas et al. ...................... | 136/30 X |
| 3,069,486 | 12/1962 | Solomon et al. ..................... | 136/30 |
| 3,201,281 | 8/1965 | Solomon et al. ..................... | 136/30 |
| 3,543,662 | 12/1970 | Erlich ................................. | 95/11 |
| 3,563,805 | 2/1971 | Deierhoi, Jr. ...................... | 136/111 |
| 3,617,387 | 11/1971 | Grulke ................................. | 136/111 |
| 3,647,544 | 3/1972 | Schneider ........................ | 136/30 X |
| 3,672,998 | 6/1972 | Darland, Jr. ...................... | 136/30 |
| 3,734,780 | 5/1973 | Bilhorn et al. .................... | 136/111 |
| 3,740,270 | 6/1973 | Bilhorn .............................. | 136/111 |
| 3,770,504 | 11/1973 | Bergum ........................ | 136/111 X |
| 3,770,505 | 11/1973 | Bergum et al. .................. | 136/111 X |

*Primary Examiner*—Charles F. LeFevour
*Attorney, Agent, or Firm*—Philip G. Kiely

[57] ABSTRACT

A relatively thin, flat or planar battery which includes one or more cells, each cell having a planar anode in superposed relationship with a planar cathode and a separator disposed intermediate and extending substantially coextensive the facing surfaces of the anode and cathode and possessing an aqueous electrolyte solution disposed in the central portion of the separator. The end cell anode comprises a zinc sheet carrying a coating of zinc particles wherein both the sheet and the particles are in contact with the electrolyte.

12 Claims, 4 Drawing Figures

U.S. Patent  Jan. 1, 1980  Sheet 2 of 2  4,181,778

NOVEL BATTERY ANODE

CROSS-REFERENCE TO OTHER APPLICATIONS

This application is a continuation-in-part of application Ser. No. 443,126, filed Feb. 15, 1974 now abandoned.

BACKGROUND OF THE INVENTION

The present invention is concerned with new and improved flat or planar batteries of the general type disclosed in U.S. Pat. Nos. 3,563,805; 3,617,387; 3,734,780; 3,780,504; and the like.

As disclosed in the cited patents, in general such planar energy cells or batteries comprise superposed planar anode/cathode combinations possessing a separator disposed intermediate each anode and cathode and electrolyte disposed on or impregnated in the separator and in contact with respective facing surfaces of the anode and cathode.

Planar batteries of the type disclosed in the aforementioned U.S. patents are generally intended to be employed as an individual power source for portable electrically operated devices wherein the selected device design parameters are optimized by the availability and employment of a planar battery exhibiting reliability with respect to its power delivery characteristics. Batteries of the type in question presently are employed commercially to operate the various electrically powered systems of the photographic camera sold by Polaroid Corporation, Cambridge, Massachusetts, U.S.A., under the trademark "SX-70". In such cameras, the battery, disposed as a component of a film pack for employment in and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions must deliver the required series of high current pulses dictated by the photographic system design.

As disclosed in U.S. Pat. No. 3,543,662, and the like, such batteries may constitute a constituent component of a photographic film assembly which comprises a cassette configured to retain a predetermined number of film units for selective sequential photoexposure and a flat or planar battery for powering various photographic camera instrumentalities for photographic employment of the film units.

In present commercial employment, the planar batteries distributed comprise, in essence, primary batteries of the LeClanche type employing an aqueous electrolyte system which includes the conventional ionizable ammonium and/or zinc salt components of such type, e.g., ammonium and/or zinc chloride, and mercuric chloride present to inhibit the generation of hydrogen derived from electrolyte attack on LeClanche type zinc constituted battery anode materials.

The anode is preferably zinc and is employed either in sheet form, or in particulate form held together by a suitable porous binder material. While sheet zinc is preferred because of battery performance, it is embrittled by the mercuric chloride amalgamating agent and it is economically unsuitable to employ a sheet thick enough to overcome the embrittlement problem. Zinc particles, on the other hand, often contain relatively large amounts of zinc oxide which, on contact with the electrolyte, slowly dissolves providing fresh, unamalgamated zinc surfaces which may result in increased hydrogen gas generation and attendant increase in impedance. The end cell anode is generally separated from a metal current collector (usually steel) by a conductive plastic layer, such as carbon filled polyvinyl chloride commercially available under the trade name "Condulon".

A novel galvanic cell has now been found which has decreased susceptibility to the aforementioned deficiencies of the prior art.

SUMMARY OF THE INVENTION

The present invention is directed to a new and improved energy cell or battery which comprises one or more individual cells each of which include a planar anode superposed substantially coextensive a planar cathode and possessing a planar separator including an electrolyte permeable central portion surrounded by substantially electrolyte-free marginal portions positioned between the anode and cathode. Aqueous electrolyte is disposed in the central portion of the separator and in contact with opposed facing surfaces of both the anode and cathode. The improvement resides in employing, as the end cell anode, a sheet of zinc, carrying on one surface, i.e., the surface nearest to the cathode, particles of zinc with both the sheet and the particles of zinc being in contact with the electrolyte.

DETAILED DESCRIPTION OF THE INVENTION

As disclosed in previously mentioned U.S. Pat. No. 3,543,662, a film pack or cassette for photographic cameras may be configured to retain a number of film units for selective sequential exposure and a flat or planar battery assembly for powering various photographic camera instrumentalities for employment of the film units.

In accordane with the present invention, the preferred form of a battery assemblage of the present invention for employment in such film assemblage comprises one or more planar electrical energy cells, each cell in series relationship and including superposed planar anode and cathode elements having disposed between their facing surfaces a separator possessing an electrolyte permeable central portion or section surrounded by substantially electrolyte-free marginal portions. Aqueous electrolyte is disposed in the central section and in contact with the facing surfaces of both the anode and cathode, and electrically nonconducting adhesive is disposed providing an aqueous electrolyte impermeable seal between the marginal portions of the separator and the next adjacent facing anode and cathode surfaces to prevent escape of the aqueous electrolyte from its special location within the electrical energy generating components of the cell. The end cell anode is composed of sheet zinc carrying particles of the same metal of one surface thereof, wherein said particles are on the surface facing the next adjacent cathode surface. The metal particles may cover the entire surface of the sheet metal or only be coextensive with the area contacted by the electrolyte, i.e., the marginal edge portions of the end cell anode may or may not contain metal particles as desired. The particles are in electronic contact with the sheet and the particle layer is sufficiently permeable to permit the electrolyte to contact the sheet.

Figure 1:
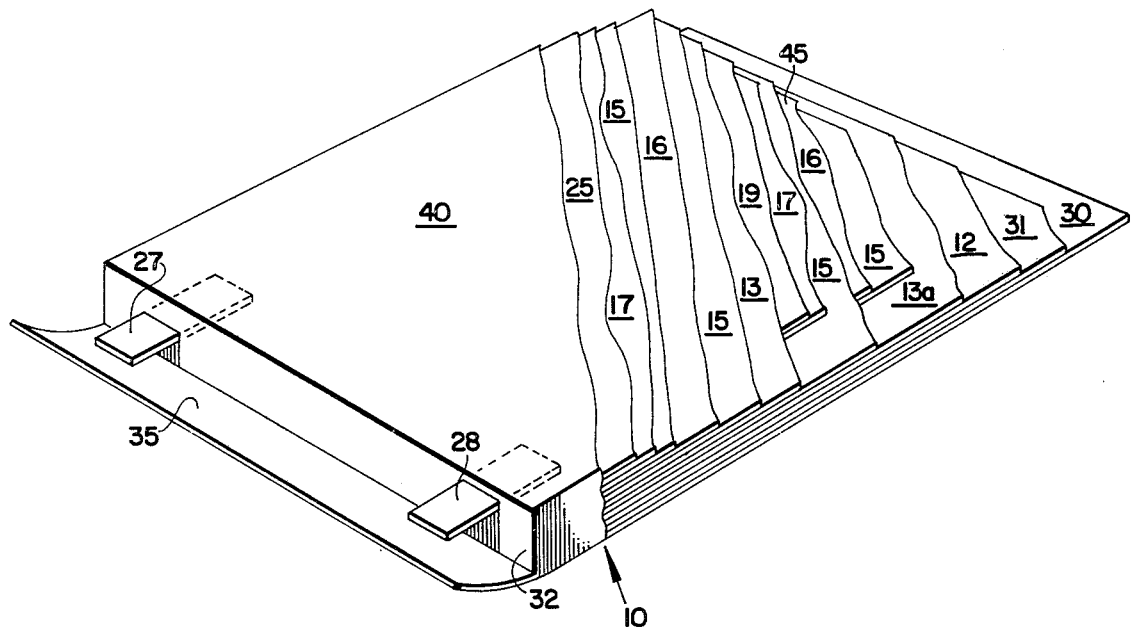
FIG. 1 is a fragmentary perspective view of one embodiment of a battery unit of the present invention.
Figure 2:
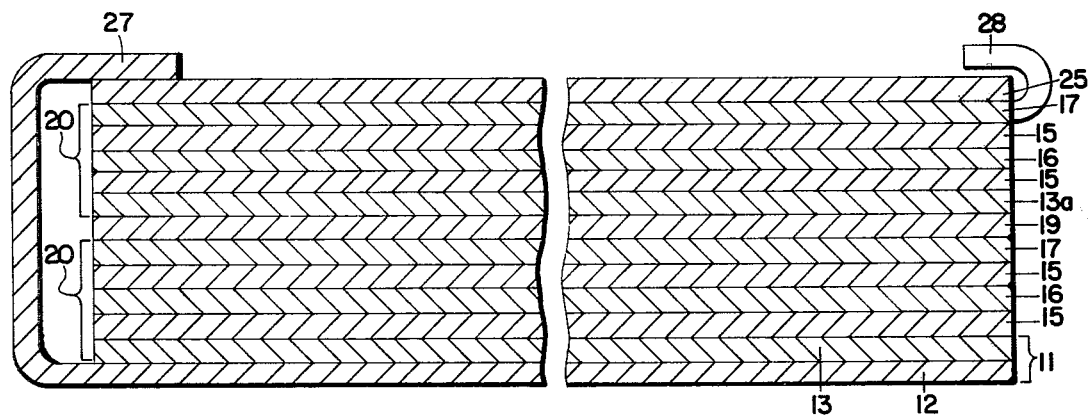
FIG. 2 is a diagrammatic enlarged partial cross-sectional view of a battery similar to FIG. 1, illustrating the association of elements constituting a multicell battery assemblage.

Referring to the drawings, there is shown in perspective in FIG. 1 and in cross-section in FIG. 2 specified batteries or energy cells of the present invention.

As shown in FIGS. 1 and 2, battery 10 may comprise envelope or container 30 retaining electrical energy generating components 20 of the battery disposed within electrically nonconducting, preferably vapor impervious sealant 31 extending around and coextensive the external or exterior surfaces of the aforementioned generating components. Sealant 31 acts to encapsulate the energy components and alone/and taken together with envelope 30 prevents escape of aqueous electrolyte 15 and/or electrolyte solvent or vapor from its predetermined spacial location within battery 10's structure.

Electrical leads 27 and 28, respectively, extend from the interior of the battery and, specifically, individually from anode 11 and from cathode 17 through encapsulating matrix 31 for interconnection with the intended device to be powered by the cell.

Prior art batteries generally employ a metallic collector plate in conjunction with the end cell anode and which terminates in the leads. In the present invention, however, the collector plate is an inherent part of the end cell anode, i.e., it may be considered an extension of the anode 11. The anode of the present invention also eliminates the need for a layer of polymeric conductive material which is generally employed intermediate the anode and the collector plate, thus achieving a cost reduction. The elimination of the polymeric conductive material reduces or substantially eliminates the delamination problem which in prior art batteries is often the result of the accumulation of hydrogen between the collector plate and the polymeric conductive material. Such delamination is a major source of increase in impedance during battery storage. Bonding the sheet metal to a layer of metal particles permits retaining the advantage of the higher current flow resulting from the large surface area provided by the particles. The same metal is used for both sheet and particle to avoid internal potential.

As seen by reference to FIGS. 1 and 2, electrical energy generating components 20 comprise, in essence, planar end cell anode 11 composed of sheet zinc 12 carrying on one surface a layer of zinc particles 13. Anode 11 is in superposed planar relationship with planar cathode 17 having separator 16 disposed intermediate anode 11 and cathode 17. Aqueous electrolyte 15 is disposed substantially within separator 16 and in contact with each of facing surfaces of anode 11 and cathode 17. In anode other than the end cell anode, e.g., anode 13a, may be of conventional anode construction such as zinc particles.

In the preferred embodiment, the battery will ordinarily comprise a LeClanche electrochemical system including a zinc negative or anode system 11 of the present invention and a manganese dioxide positive or cathode system 17. The aqueous electrolyte 15 will generally comprise an aqueous ammonium chloride and/or zinc chloride electrolyte which will be disposed between and in contact with the facing surface of each of the anode and the cathode and in contact and impregnated into electrolyte permeable central portion of separator 16.

The anode 11 of the present invention comprises metallic sheet zinc, generally less than 10 mils in thickness, carrying on the surface next adjacent the cathode, a layer of zinc particles. The term "zinc particle" as used herein is intended to refer to particles of zinc retained in a suitable matrix. The employment of such zinc particles alone as an anode is conventional and well known in the art. For example, the zinc particle layer may be formed as described in U.S. Pat. No. 3,770,504, and may be deposited as a mixture of powdered zinc, a small amount of carbon black, an acrylic resin as a binder as well as a dispersing agent and water. The preferred anode comprises sheet zinc about 2½ mils in thickness carrying a layer of zinc particles having a coverage of about 0.1 g per square inch.

The preferred cathode 17 may itself comprise, for example, a manganese dioxide/carbon mixture dispersed in a polymeric binder and may also include a metallic sheet current collector plate 25 which is preferably an aluminum, lead or steel sheet material on the order of 10 mils or less in thickness, which may also include a polymeric current conductor which is preferably a sheet of electrically conductive carbon sold under the trade designation as "Condulon".

Electroyte 15 will ordinarily comprise a conventional solution of aqueous ammonium chloride/zinc chloride about 4:1 dispersed in a polymeric binder, for example, on the order of about five or more percent applied to and impregnated in central portion of separator 16 and in contact with the facing surfaces of active positive material 13 and active negative material 17.

In general, marginal portions 45 of separator 16 will be maintained free of electrolyte 15 and may be coated on each surface with and impregnated by a suitable adhesive such as a polymeric hot melt adhesive, for example, a conventional hot melt vinyl adhesive, adapted to secure the separator to the anode and cathode, respectively, for example, marginal sections 45 of separator 16 to the facing marginal sections of anode 11 and cathode 17.

As seen by reference to FIG. 1, batteries of the type detailed in FIG. 2 may be prepared, in accordance with one embodiment of the present invention, by assembling the aforementioned electrical energy generating components 20 of the battery in the configuration detailed above and disposing the assemblage of components within the confines of container 30. Thermoplastic sealant 31 is provided in fluid state to container 30 to effect encapsulation and sealing of the assemblage upon solidification of the sealant. Flap 35 of container 30 together with electrical leads 27 and 28 may be biased to overlie surface 40 of container 30 thus providing both positive and negative leads contiguous surface 40 to present the leads at terminal ports 52 and 53 of photographic film pack container 54 illustrated in FIG. 3.

Between each consecutive pair of cells is an impervious intercell connector 19 which may take several different embodiments. Regardless of the specific embodiment, the impervious intercell connector 19 must meet three essential requirements: it must be impervious to the electrolyte of the battery so that one cell may be sealed off from the next; it must provide some means by which electrical current may be conducted between the positive electrode in one cell and the negative electrode in the next cell; and it must not create any undesired electrochemical reactions with the electrodes or other components of the battery. Such intercell connectors are conventional and well known to the art. For example, the above-mentioned "Condulon" may be employed as an intercell connective.

Container 30 may itself comprise any container material that will appropriately retain the electrical energy generating components 20, for example, forty to sixty pound grease-proof glassine envelopes sold by Deerfield Paper Company under the trade designation "H-99" and Riegal Products Company under the trade designation "KA60AA" and the photographic film pack containers detailed hereinafter.

Separator 16 will be constructed of and comprise a conventional battery separator material such as aqueous electrolyte permeable fibrous sheet materials, for example, microporous paper, kraft papers and polymeric sheet materials such as woven polyester sheet, etc.

The battery itself may comprise a multicell structure preferably arranged and constructed with the cells of the battery in superposed or stacked configuration and in electrical series relationship; the number of such cells is determined by the power output of each cell and the power requirements of the device to be energized by the battery.

As previously stated, planar batteries of the type described herein are specifically adapted to commercial employment to operate the various electrically powered photographic systems of the photographic camera sold by Polaroid Corporation under the trademark "SX-70".

As disclosed in U.S. Pat. No. 3,543,662, a film pack or cassette for photographic cameras may be configured to retain a number of film units for selective sequential exposure and a flat or planar battery assembly for powering various photographic camera instrumentalities for employment of the film units.

Figure 3:
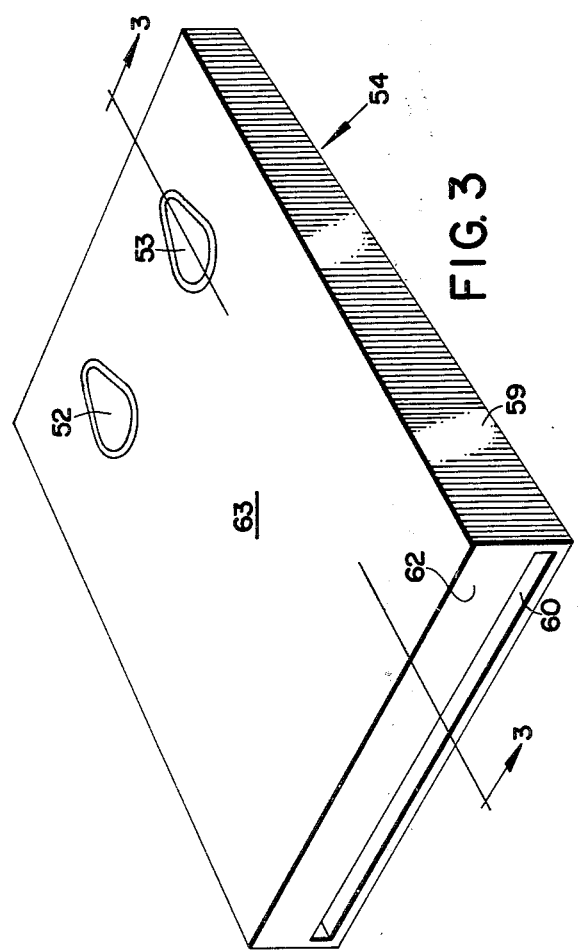
FIG. 3 is a perspective view of a parallelepiped container adapted to enclose and retain photographic film units and a battery constructed in accordance with the present invention.
Figure 4:
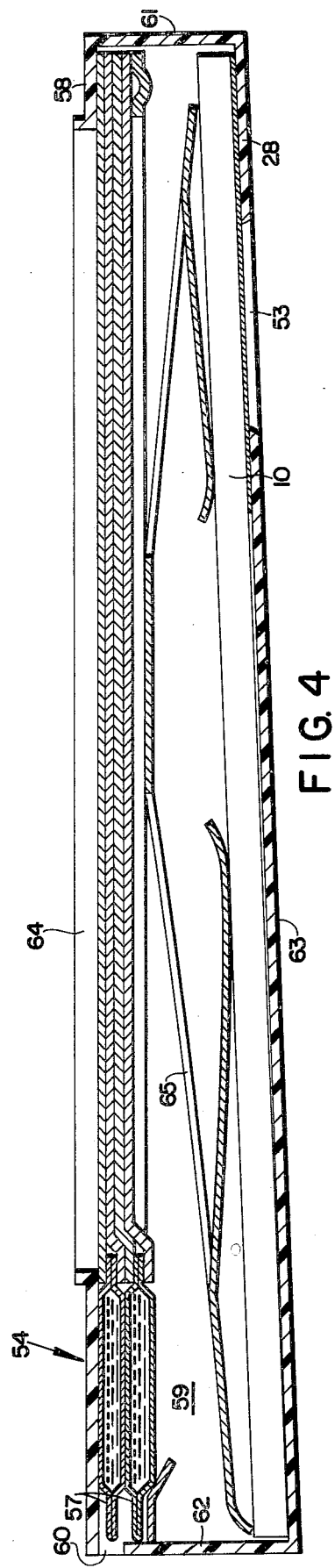
FIG. 4 is a diagrammatic cross-sectional view of the container of FIG. 3, along line 3—3, illustrating disposition of photographic film units and the battery of FIG. 1.

As seen by reference to FIGS. 3 and 4, the cassette may comprise a generally parallelepiped container or box 54 for holding and enclosing a plurality of film units 57 and a planar battery assemblage 10. Container 54 is shown as comprising a forward wall 58, side walls 59, a trailing end wall 61, a leading end wall 62, and a rear wall 63 and may be formed of a resilient plastic material. Forward wall 58 is provided with a generally rectangular exposure aperture 64 for transmitting light for exposing film unts 57 carried within container 54. Leading end wall 62 is provided with a generally rectangular slot or exit orifice to provide a passage 60 at the leading end of the container through which film units 57 carried by the container are adapted to be individually withdrawn. Container 54 may additionally be provided with a dark slide or cover sheet (not shown) of any suitable opaque material such as paper or plastic sheet material positioned between the forwardmost film unit 57 and aperture 64 to serve as a light seal and which may be removed through withdrawal slot 60 once container 54 is located in its operative position within a camera apparatus.

The stack arrangement within container 54 of a plurality of film units 57 (two are shown) and a planar battery 10 is illustrated in FIG. 4. Each film unit 57 is arranged in overlying relationship with its exposure surface facing in the direction of exposure aperture 64.

As disclosed in aforementioned U.S. Pat. No. 3,543,662, the cassette additionally includes a spring-located platform 65 positioned between planar battery 10 and next adjacent film unit 57 for compressively retaining terminals 27 and 28 next adjacent cassette terminal ports 52 and 53 for interengagement with camera electrical leads, and for biasing film units 57 in the direction of exposure aperture 64.

Film units 10 may be advantageously constructed in accordance with the disclosure of any of U.S. Pat. Nos. 3,415,644; 3,594,165; 3,689,262; 3,672,890; or the like.

The capacity of each of the primary battery cells as described will vary substantially in proportion to the areas of their active surfaces. Typically, one such cell will produce about 0.10 to 0.15 amperes per square inch of surface area while yielding about 1.5 volts. For popular photographic camera sizes, an area within each film cassette available for retaining the batteries will provide about 10 to 12 square inches of practical surface. It follows, therefore, that the battery capacity desired for a film supply-power source combination readily may be varied through the simple expedient of combining a select number of discrete cells of predetermined dimension.

While it is preferred to employ the aforementioned LeClanche electrochemical system (comprising manganese dioxide positive active material and an electrolyte comprising ammonium chloride and/or zinc chloride) with the novel anode of the present invention, the battery may employ a wide variety of positive electrode materials and a wide variety of electrochemical systems including both primary and secondary systems. Among the positive electrode materials are such commonly used inorganic metal oxides as the previously described manganese dioxide, lead dioxide, nickel oxyhydroxide, mercuric oxide, and silver oxide, inorganic metal halides such as silver chloride and lead chloride, and organic materials capable of being reduced. The invention may employ the electrolytes commonly used in the LeClanche system (ammonium chloride and/or zinc chloride), various alkaline electrolytes such as the hydroxides of potassium, sodium, and/or lithium, and acidic electrolytes such as sulfuric or phosphoric acids, the electrolytes, of course, being chosen to be compatible with the positive and negative electrodes.

As stated above, cells employing the novel anode of the present invention provide more stable and reliable batteries. The following table sets forth the results of accelerated aging tests on batteries within the scope of the present invention as compared with a control.

The batteries were 4 cell, 6 volt planar batteries of the type described above.

CONTROL I

The control battery was a LeClanche battery of the type shown, for example, in U.S. Pat. No. 3,770,504, with a manganese dioxide/carbon cathode, an ammonium chloride/zinc chloride electrolyte with 2% mercuric chloride and a zinc particle anode, composed of the following:

| | |
|---|---|
| Water | 150 g. |
| Bentonite | 0.62 g. |
| Tetrasodium pyrophosphate | 0.25 g. |
| Carbon black | 5.0 g. |
| Polytex 6510 (a synthetic polymeric latex sold by Celanese Corp., N.Y., N.Y.) | 39.1 g. |
| Zinc particle (average particle size <10 microns) | 1000 g. |

The zinc coverage was about 0.45 g/4.5 square inch. The zinc particle anode was separated from the steel current collector by a "Condulon" conductive plastic layer.

CONTROL II

A second control was prepared employing the same materials as in Control I except that the end cell anode was composed of a 2½ mil sheet of zinc (serving as both anode and current collector) having a centrally located row of gas release orifices or vents approximately 1/16 inch in diameter, ½ inch apart (on center) as described in the copending application of Edwin H. Land, Ser. No. 403,039, filed Oct. 3, 1973, the disclosure of which is expressly incorporated herein. The vents were covered by a plastic sheet permeable to hydrogen but substantially impermeable to water vapor.

EXAMPLE I

A battery was prepared as in Control II except that the end cell anode comprised a 2½ mil sheet of zinc, having the above described gas release orifices and plastic sheet covering, and carrying on the surface facing the cathode a layer permeable to electrolyte of zinc particles at a coverage at 0.1 g./in.$^2$.

EXAMPLE II

A battery was prepared as in Example I except that instead of mercuric chloride 0.01% by weight based on the weight of electrolyte of tetrabutyl ammonium chloride was employed as a stabilizer.

The batteries were subjected to an accelerated aging test wherein the batteries were subjected to 120° F. for 7 days. The initial open circuit voltage (OCV) and closed circuit voltage (CCV) were measured in volts on the second day after assembly (to allow the battery to equilibrate prior to voltage measurement and before they were subjected to the elevated temperatures) and on the seventh day of the test.

TABLE 1

| | (CONTROL I) | | | |
|---|---|---|---|---|
| | Initial Voltage | | Seventh Day | |
| Battery No. | OCV | CCV | OCV | CCV |
| 1 | 6.37 | 5.59 | 6.30 | 5.72 |
| 2 | 6.37 | 5.59 | 6.35 | 5.82 |
| 3 | 6.37 | 5.67 | 6.32 | 5.83 |
| 4 | 6.37 | 5.62 | 6.36 | 5.72 |
| 5 | 6.39 | 5.70 | 6.16 | 5.59 |
| 6 | 6.40 | 5.56 | 6.20 | 5.00 |
| 7 | 6.38 | 5.57 | 6.26 | 5.53 |
| 8 | 6.40 | 5.52 | 6.15 | 4.23 |
| 9 | 6.38 | 5.65 | 6.26 | 5.69 |
| 10 | 6.39 | 5.58 | 6.17 | 5.36 |
| Average | 6.38 | 5.61 | 6.25 | 5.45 |

The average OCV loss was 130 millivolts, and the average CCV loss was 160 millivolts.

TABLE 2

| | (CONTROL II) | | | |
|---|---|---|---|---|
| | Initial Voltage | | Seventh Day | |
| Battery No. | OCV | CCV | OCV | CCV |
| 1 | 6.46 | 5.63 | 6.38 | 5.65 |
| 2 | 6.46 | 5.24 | 6.40 | 5.75 |
| 3 | 6.46 | 5.71 | 6.28 | 5.73 |
| 4 | 6.46 | 5.70 | 6.22 | 5.65 |
| 5 | 6.46 | 5.66 | 6.21 | 5.67 |
| 6 | 6.46 | 5.72 | 6.22 | 5.22 |
| 7 | 6.46 | 5.70 | 6.32 | 5.89 |
| 8 | 6.46 | 5.66 | 6.40 | 5.73 |
| 9 | 6.46 | 5.69 | 6.23 | 5.11 |
| 10 | 6.49 | 5.59 | 6.30 | 5.68 |
| Average | 6.46 | 5.63 | 6.30 | 5.61 |

The average OCV loss was 160 millivolts and the average CCV loss was 20 millivolts.

TABLE 3

| | (EXAMPLE I) | | | |
|---|---|---|---|---|
| | Initial Voltage | | Seventh Day | |
| Battery No. | OCV | CCV | OCV | CCV |
| 1 | 6.38 | 5.74 | 6.40 | 5.93 |
| 2 | 6.38 | 5.72 | 6.21 | 5.74 |
| 3 | 6.38 | 5.19 | 6.15 | 5.63 |
| 4 | 6.39 | 5.75 | 6.40 | 5.91 |
| 5 | 6.38 | 5.72 | 6.20 | 5.67 |
| 6 | 6.38 | 5.75 | 6.39 | 5.95 |
| 7 | 6.39 | 5.81 | 6.41 | 5.92 |
| 8 | 6.39 | 5.65 | 6.41 | 5.89 |
| 9 | 6.39 | 5.73 | 6.40 | 5.90 |
| 10 | 6.38 | 5.75 | 6.41 | 5.94 |
| Average | 6.38 | 5.68 | 6.34 | 5.85 |

The average OCV loss was 40 millivolts and the average CCV reading was an increase of 170 millivolts.

TABLE 4

| | (EXAMPLE II) | | | |
|---|---|---|---|---|
| | Initial Voltage | | Seventh Day | |
| Battery No. | OCV | CCV | OCV | CCV |
| 1 | 6.37 | 5.70 | 6.39 | 5.70 |
| 2 | 6.40 | 5.66 | 6.31 | 5.68 |
| 3 | 6.38 | 5.65 | 6.29 | 5.69 |
| 4 | 6.37 | 5.59 | 6.42 | 5.43 |
| 5 | 6.38 | 5.58 | 6.39 | 5.70 |
| 6 | 6.40 | 5.65 | 6.43 | 5.72 |
| 7 | 6.39 | 5.63 | 6.42 | 5.59 |
| 8 | 6.36 | 5.69 | 6.36 | 5.69 |
| 9 | 6.36 | 5.60 | 6.41 | 5.70 |
| 10 | 6.38 | 5.62 | 6.39 | 5.71 |
| Average | 6.38 | 5.64 | 6.38 | 5.66 |

The average OCV was unchanged while the average CCV showed an increase of 20 millivolts.

Batteries prepared as described above were also stored at room temperature for sixty-seven days. The OCV and CCV were measured as above.

TABLE 5

| | (CONTROL I) | | | |
|---|---|---|---|---|
| | Initial Voltage | | Sixty-seventh Day | |
| Battery No. | OCV | CCV | OCV | CCV |
| 1 | 6.37 | 5.75 | 1.71 | 0.00 |
| 2 | 6.38 | 5.66 | 6.31 | 5.62 |
| 3 | 6.38 | 5.59 | 6.32 | 5.65 |
| 4 | 6.39 | 5.54 | 6.16 | 5.38 |
| 5 | 6.37 | 5.69 | 6.32 | 5.68 |
| 6 | 6.37 | 5.67 | 6.33 | 5.54 |
| 7 | 6.39 | 5.47 | 6.32 | 5.66 |
| 8 | 6.40 | 5.70 | 6.38 | 5.66 |
| 9 | 6.30 | 5.69 | 6.33 | 5.65 |
| 10 | 6.38 | 5.63 | 6.23 | 5.32 |

TABLE 5-continued

| | (CONTROL I) | | | |
|---|---|---|---|---|
| | Initial Voltage | | Sixty-seventh Day | |
| Battery No. | OCV | CCV | OCV | CCV |
| Average (excluding shorted battery 1) | 6.37 | 5.62 | 6.30 | 5.57 |

The average OCV loss was 70 millivolts and the average CCV loss was 50 millivolts.

TABLE 6

| | (CONTROL II) | | | |
|---|---|---|---|---|
| | Initial Voltage | | Sixty-seventh Day | |
| Battery No. | OCV | CCV | OCV | CCV |
| 1 | 6.46 | 5.64 | 6.32 | 5.48 |
| 2 | 6.46 | 5.68 | 6.32 | 5.42 |
| 3 | 6.47 | 5.71 | 4.36 | .30 |
| 4 | 6.47 | 5.64 | 6.32 | 5.72 |
| 5 | 6.47 | 5.68 | 6.33 | 5.65 |
| 6 | 6.47 | 5.66 | 6.20 | 5.35 |
| 7 | 6.46 | 5.71 | 6.31 | 5.73 |
| 8 | 6.47 | 5.70 | 6.25 | 5.51 |
| 9 | 6.46 | 5.70 | 6.12 | 4.73 |
| 10 | 6.45 | 5.64 | 6.31 | 5.70 |
| Average (excluding shorted battery 3) | 6.47 | 5.67 | 6.28 | 5.48 |

The average OCV loss was 190 millivolts and the average CCV loss was 190 millivolts.

TABLE 7

| | (EXAMPLE I) | | | |
|---|---|---|---|---|
| | Initial Voltage | | Sixty-seventh Day | |
| Battery No. | OCV | CCV | OCV | CCV |
| 1 | 6.38 | 5.75 | 6.26 | 5.58 |
| 2 | 6.39 | 5.74 | 6.34 | 5.75 |
| 3 | 6.37 | 5.74 | 3.30 | .03 |
| 4 | 6.39 | 5.72 | 6.35 | 5.72 |
| 5 | 6.38 | 5.72 | 6.36 | 5.69 |
| 6 | 6.39 | 5.78 | 6.37 | 5.63 |
| 7 | 6.38 | 5.57 | 6.33 | 5.74 |
| 8 | 6.38 | 5.75 | 6.32 | 5.61 |
| 9 | 6.31 | 5.74 | 6.33 | 5.52 |
| 10 | 6.38 | 5.64 | 6.33 | 5.79 |
| Average (excluding shorted battery 3) | 6.38 | 5.71 | 6.33 | 5.67 |

The average OCV loss was 50 millivolts and the average CCV loss was 40 millivolts.

TABLE 8

| | (EXAMPLE II) | | | |
|---|---|---|---|---|
| | Initial Voltage | | Sixty-seventh Day | |
| Battery No. | OCV | CCV | OCV | CCV |
| 1 | 6.40 | 5.57 | 6.34 | 5.64 |
| 2 | 6.38 | 5.66 | 6.35 | 5.63 |
| 3 | 6.38 | 5.65 | 6.30 | 5.65 |
| 4 | 6.40 | 5.62 | 6.36 | 5.56 |
| 5 | 6.39 | 5.62 | 6.31 | 5.64 |
| 6 | 6.40 | 5.58 | 6.31 | 5.59 |
| 7 | 6.39 | 5.62 | 6.35 | 5.35 |
| 8 | 6.38 | 5.67 | 6.34 | 5.55 |
| 9 | 6.39 | 5.61 | 6.33 | 5.53 |
| 10 | 6.39 | 5.72 | 6.33 | 5.59 |
| Average | 6.39 | 5.63 | 6.33 | 5.57 |

The average OCV and CCV loss was 60 millivolts.

From the foregoing, it will be seen that the novel batteries of the present invention maintain their electrical properties better than prior art batteries. In particular, the internal resistance of the battery, as measured by CCV, does not increase with time to the same extent as prior art batteries.

What is claimed is:

1. In a planar battery which comprises, in combination and in superposed relationship, electrical energy generating components including:
   (a) a planar end cell anode;
   (b) a planar cathode comprising manganese dioxide/carbon black superposed substantially coextensive the anode;
   (c) a planar separator positioned intermediate and extending substantially coextensive the facing surfaces of the anode and the cathode; and
   (d) a solution of an electrolyte comprising ammonium chloride/zinc chloride disposed in the separator and in contact with the facing surfaces of the anode and the cathode;
   the improvement which comprises said end cell anode comprising a zinc sheet carrying a layer of zinc particles on the surface thereof next adjacent said cathode, wherein both said sheet and said particles are in contact with said electrolyte.

2. The product of claim 1 wherein said anode includes at least one gas release orifice extending through said sheet normal to its plane.

3. The product of claim 1 wherein the carbon and manganese dioxide are disposed in an electrically conductive ionically permeable polymeric matrix.

4. The product of claim 1 wherein said zinc particle layer includes a polymeric binder.

5. The product of claim 3 wherein the carbon/manganese dioxide mixture is secured to the surface of a conductive carbon retaining polymeric sheet positioned distal the separator.

6. The product of claim 5 wherein a conductive metallic sheet is secured to the surface of the exterior conductive carbon retaining sheet opposite the carbon/manganese mixture.

7. The product of claim 6 wherein the electrolyte is disposed in an ionically permeable polymeric matrix.

8. The product of claim 7 wherein the separator comprises electrolyte permeable fibrous sheet.

9. The product of claim 1 wherein the marginal portions of the separator comprise electrolyte permeable separator sheet impregnated with an electrolyte impermeable thermoplastic polymer in a concentration effective to prevent electrolyte permeation of the marginal portions of the separator sheet.

10. The product as defined in claim 1 which includes a plurality of cells in stacked and series relationship.

11. A planar battery which comprises a plurality of cells which comprise, in order:
   (a) a planar metal anode;
   (b) a planar separator positioned intermediate the facing surfaces of the anode and the cathode;
   (c) a solution of an electrolyte comprising ammonium chloride/zinc chloride disposed in said separator and in contact with said anode and said cathode;
   (d) a planar cathode comprising manganese dioxide/carbon dioxide; and
   (e) a conductive, electrolyte impermeable intercell connector disposed intermediate each consecutive pair of cells; wherein the end cell anode comprises a zinc sheet carrying a layer of zinc particles on the surface thereof next adjacent said cathode; wherein both said sheet and said particles are in contact with said electrolyte.

12. The battery as defined in claim 11 wherein said metal sheet includes at least one gas release orifice extending through said sheet normal to its plane.

* * * * *